(12) United States Patent
Schneider et al.

(10) Patent No.: US 7,794,322 B2
(45) Date of Patent: Sep. 14, 2010

(54) SYSTEM FOR AWARDING A BONUS TO A GAMING DEVICE ON A WIDE AREA NETWORK

(75) Inventors: Richard J. Schneider, Las Vegas, NV (US); Michael B. Shelby, Corvallis, OR (US); Lawrence R. Pitman, Corvallis, OR (US); Carrie D. Porterfield, Las Vegas, NV (US); Erik B. Petersen, Corvallis, OR (US)

(73) Assignee: IGT, Reno, NV (US)

( * ) Notice: Subject to any disclaimer, the term of this patent is extended or adjusted under 35 U.S.C. 154(b) by 985 days.

(21) Appl. No.: 10/256,949

(22) Filed: Sep. 27, 2002

(65) Prior Publication Data

US 2003/0092484 A1 May 15, 2003

Related U.S. Application Data

(60) Provisional application No. 60/326,030, filed on Sep. 28, 2001.

(51) Int. Cl.
*A63F 9/00* (2006.01)
(52) U.S. Cl. ............... 463/27; 463/16; 463/17; 463/18; 463/19; 463/20; 463/24; 463/25; 463/26; 463/40; 463/41; 463/42
(58) Field of Classification Search ............ 463/40–42, 463/24–27, 1, 16–20
See application file for complete search history.

(56) References Cited

U.S. PATENT DOCUMENTS 3,998,309 A 12/1976 Mandas et al. ............ 194/97 R (Continued)

FOREIGN PATENT DOCUMENTS

AU 524709 8/1979

(Continued)

OTHER PUBLICATIONS

PCT Partial International Search Report, International Application No. PCT/US 02/30858, International Filing Date: Sep. 27, 2002, Applicant: Acres Gaming Incorporated.

(Continued)

*Primary Examiner*—Peter DungBa Vo
*Assistant Examiner*—David Duffy
(74) *Attorney, Agent, or Firm*—Weaver Austin Villeneuve & Sampson LLP

(57) ABSTRACT

A method for awarding a bonus to a player of an electronic gaming device at one of a plurality of casino properties is implemented with a slave server networked with gaming devices at each property. The slave servers are networked with a master server that accumulates a pool comprising a percentage of play on the gaming devices. The pool is initiated with a starting value, which defines the lower end of a range having a predetermined maximum number at the upper end. A number is randomly selected from within the range. As play progresses, the pool increases until it hits the random number. As a result, a slave server is randomly selected. The randomly selected slave server then awards the bonus to a randomly selected one of its associated gaming devices.

21 Claims, 2 Drawing Sheets

U.S. PATENT DOCUMENTS

| | | | |
|---|---|---|---|
| 4,072,930 A | 2/1978 | Lucero et al. | |
| 4,200,770 A | 4/1980 | Hellman et al. | |
| 4,238,127 A | 12/1980 | Lucero et al. | 273/143 R |
| 4,283,709 A | 8/1981 | Lucero et al. | |
| 4,335,809 A | 6/1982 | Wain | |
| 4,409,656 A | 10/1983 | Andersen et al. | |
| 4,494,197 A | 1/1985 | Troy et al. | |
| 4,573,681 A | 3/1986 | Okada | 273/143 R |
| 4,582,324 A | 4/1986 | Koza et al. | |
| 4,624,459 A | 11/1986 | Kaufman | |
| 4,636,951 A | 1/1987 | Harlick | |
| 4,652,998 A | 3/1987 | Koza et al. | 364/412 |
| 4,657,256 A | 4/1987 | Okada | 273/143 |
| 4,669,731 A | 6/1987 | Clarke | 273/143 R |
| 4,760,527 A | 7/1988 | Sidley | |
| 4,764,666 A | 8/1988 | Bergeron | |
| 4,772,023 A | 9/1988 | Okada | 273/143 |
| 4,805,907 A | 2/1989 | Hagiwara | |
| 4,837,728 A | 6/1989 | Barrie et al. | |
| 4,842,278 A | 6/1989 | Markowicz | |
| 4,856,787 A | 8/1989 | Itkis | |
| 4,871,171 A | 10/1989 | Rivero | 273/138 A |
| 4,880,237 A | 11/1989 | Kishishita | |
| 4,926,327 A | 5/1990 | Sidley | |
| 4,964,638 A | 10/1990 | Ishida | |
| 5,038,022 A | 8/1991 | Lucero | 235/380 |
| 5,048,833 A | 9/1991 | Lamle | |
| 5,074,559 A | 12/1991 | Okada | 273/143 R |
| 5,116,055 A | 5/1992 | Tracy | 273/138 |
| 5,123,649 A | 6/1992 | Tiberio | 273/143 |
| 5,178,390 A | 1/1993 | Okada | 273/143 |
| 5,217,224 A | 6/1993 | Sincock | |
| 5,249,800 A | 10/1993 | Hilgendorf et al. | 273/183 |
| 5,259,616 A | 11/1993 | Bergmann | 273/138 A |
| 5,275,400 A | 1/1994 | Weingardt et al. | |
| 5,280,909 A | 1/1994 | Tracy | |
| 5,286,023 A | 2/1994 | Wood | 273/138 |
| 5,321,241 A | 6/1994 | Craine | |
| 5,324,035 A | 6/1994 | Morris et al. | |
| 5,326,104 A | 7/1994 | Pease et al. | 273/138 |
| 5,332,219 A | 7/1994 | Marnell, II et al. | |
| 5,342,049 A | 8/1994 | Wichinsky et al. | 273/119 R |
| 5,344,144 A | 9/1994 | Canon | |
| 5,351,970 A | 10/1994 | Fioretti | |
| 5,393,057 A | 2/1995 | Marnell, II | 273/85 CP |
| 5,398,932 A | 3/1995 | Eberhardt et al. | |
| 5,401,024 A | 3/1995 | Simunek | 273/138 |
| 5,423,539 A | 6/1995 | Nagao | 273/143 R |
| 5,429,361 A | 7/1995 | Raven et al. | |
| 5,470,079 A | 11/1995 | LeStrange et al. | |
| 5,476,259 A | 12/1995 | Weingardt | 273/85 |
| 5,507,489 A | 4/1996 | Reibel et al. | |
| 5,524,888 A | 6/1996 | Heidel | 463/22 |
| 5,544,893 A | 8/1996 | Jones et al. | 273/309 |
| 5,547,192 A | 8/1996 | Ishibashi | 463/26 |
| 5,564,700 A | 10/1996 | Celona | |
| 5,570,885 A | 11/1996 | Ornstein | 463/27 |
| 5,580,309 A | 12/1996 | Piechowiak | |
| 5,586,937 A | 12/1996 | Menashe | |
| 5,611,535 A | 3/1997 | Tiberio | 273/143 |
| 5,611,730 A | 3/1997 | Weiss | 463/20 |
| 5,645,486 A | 7/1997 | Nagao et al. | |
| 5,655,961 A | 8/1997 | Acres et al. | |
| 5,674,128 A | 10/1997 | Holch et al. | |
| 5,702,304 A | 12/1997 | Acres et al. | 463/29 |
| 5,707,285 A | 1/1998 | Place et al. | 463/12 |
| 5,741,183 A | 4/1998 | Acres et al. | |
| 5,743,800 A | 4/1998 | Huard et al. | |
| 5,752,882 A | 5/1998 | Acres et al. | |
| 5,761,647 A | 6/1998 | Boushy | |
| 5,762,552 A | 6/1998 | Vuong et al. | |
| 5,766,076 A | 6/1998 | Pease et al. | |
| RE35,864 E | 7/1998 | Weingardt | 463/28 |
| 5,779,545 A | 7/1998 | Berg et al. | |
| 5,779,547 A | 7/1998 | SoRelle et al. | 463/28 |
| 5,788,573 A | 8/1998 | Baerlocher et al. | 463/16 |
| 5,800,269 A | 9/1998 | Holch et al. | |
| 5,807,172 A | 9/1998 | Piechowiak | 463/20 |
| 5,816,918 A | 10/1998 | Kelly et al. | 463/16 |
| 5,820,459 A | 10/1998 | Acres et al. | |
| 5,823,874 A | 10/1998 | Adams | |
| 5,833,538 A | 11/1998 | Weiss | |
| 5,833,540 A | 11/1998 | Miodunski et al. | |
| 5,836,817 A * | 11/1998 | Acres et al. | 463/26 |
| 5,848,932 A | 12/1998 | Adams | |
| 5,851,149 A | 12/1998 | Xidos et al. | |
| 5,855,515 A * | 1/1999 | Pease et al. | 463/27 |
| 5,876,284 A | 3/1999 | Acres et al. | |
| 5,882,261 A | 3/1999 | Adams | |
| 5,885,158 A | 3/1999 | Torango et al. | 463/27 |
| 5,941,773 A | 8/1999 | Harlick | |
| 5,944,606 A * | 8/1999 | Gerow | 463/27 |
| 5,970,143 A | 10/1999 | Schneier et al. | |
| 5,984,779 A | 11/1999 | Bridgeman et al. | 463/16 |
| 6,001,016 A | 12/1999 | Walker et al. | |
| 6,003,013 A * | 12/1999 | Boushy et al. | 705/10 |
| 6,012,982 A | 1/2000 | Piechowiak et al. | |
| 6,012,983 A | 1/2000 | Walker et al. | |
| 6,030,288 A | 2/2000 | Davis et al. | |
| 6,039,648 A | 3/2000 | Guinn et al. | |
| 6,048,269 A | 4/2000 | Burns et al. | |
| 6,050,895 A | 4/2000 | Luciano, Jr. et al. | 463/7 |
| 6,059,659 A | 5/2000 | Busch et al. | |
| 6,068,553 A | 5/2000 | Parker | |
| 6,071,190 A | 6/2000 | Weiss et al. | |
| 6,077,162 A | 6/2000 | Weiss | |
| 6,080,062 A | 6/2000 | Olson | 463/42 |
| 6,082,887 A | 7/2000 | Feuer et al. | |
| 6,089,977 A | 7/2000 | Bennett | 463/20 |
| 6,089,980 A * | 7/2000 | Gauselmann | 463/27 |
| 6,099,408 A | 8/2000 | Schneier et al. | |
| 6,110,041 A | 8/2000 | Walker et al. | |
| 6,110,043 A | 8/2000 | Olsen | |
| 6,117,011 A | 9/2000 | Lvov | |
| 6,126,542 A | 10/2000 | Fier | |
| 6,135,884 A | 10/2000 | Hedrick et al. | |
| 6,142,872 A | 11/2000 | Walker et al. | |
| 6,146,270 A | 11/2000 | Huard et al. | 463/12 |
| 6,146,273 A * | 11/2000 | Olsen | 463/27 |
| 6,152,823 A | 11/2000 | LaCoste et al. | |
| 6,162,122 A | 12/2000 | Acres et al. | |
| 6,168,523 B1 | 1/2001 | Piechowiak et al. | 463/26 |
| 6,179,711 B1 | 1/2001 | Yoseloff | |
| 6,183,366 B1 | 2/2001 | Goldberg et al. | |
| 6,190,255 B1 | 2/2001 | Thomas et al. | |
| 6,203,010 B1 | 3/2001 | Jorasch | |
| 6,210,275 B1 | 4/2001 | Olsen | |
| 6,210,277 B1 | 4/2001 | Stefan | |
| 6,217,448 B1 | 4/2001 | Olsen | |
| 6,219,836 B1 | 4/2001 | Wells et al. | |
| 6,220,961 B1 | 4/2001 | Keane et al. | |
| 6,224,482 B1 | 5/2001 | Bennett | |
| 6,224,484 B1 | 5/2001 | Okuda et al. | |
| 6,231,445 B1 | 5/2001 | Acres | |
| 6,234,896 B1 | 5/2001 | Walker et al. | |
| 6,241,608 B1 | 6/2001 | Torango | |
| 6,244,958 B1 | 6/2001 | Acres | |
| 6,254,483 B1 | 7/2001 | Acres | |
| 6,257,981 B1 | 7/2001 | Acres et al. | |
| 6,264,557 B1 | 7/2001 | Schneier et al. | |
| 6,270,409 B1 | 8/2001 | Shuster | |
| 6,287,194 B1 | 9/2001 | Okada et al. | 463/16 |
| 6,287,202 B1 | 9/2001 | Pascal et al. | 463/42 |
| 6,293,866 B1 | 9/2001 | Walker et al. | |

| | | |
|---|---|---|
| RE37,414 E | 10/2001 | Harlick |
| 6,302,790 B1 | 10/2001 | Brossard |
| 6,302,793 B1 | 10/2001 | Fertitta, III et al. |
| 6,302,794 B1 | 10/2001 | Ogawa .................. 463/25 |
| 6,309,298 B1 | 10/2001 | Gerow |
| 6,309,300 B1 | 10/2001 | Glavich .................. 463/26 |
| 6,312,333 B1 | 11/2001 | Acres .................... 463/25 |
| 6,319,122 B1 | 11/2001 | Packes, Jr. et al. |
| 6,319,125 B1 * | 11/2001 | Acres .................... 463/25 |
| 6,322,309 B1 | 11/2001 | Thomas et al. |
| 6,358,149 B1 | 3/2002 | Schneider et al. |
| 6,361,441 B1 | 3/2002 | Walker et al. |
| 6,364,768 B1 | 4/2002 | Acres et al. |
| 6,364,769 B1 | 4/2002 | Weiss et al. |
| 6,371,852 B1 | 4/2002 | Acres |
| 6,375,567 B1 | 4/2002 | Acres |
| 6,375,568 B1 | 4/2002 | Roffman et al. |
| 6,375,569 B1 * | 4/2002 | Acres .................... 463/27 |
| 6,393,563 B1 | 5/2002 | Maruyama et al. |
| 6,416,409 B1 | 7/2002 | Jordan |
| 6,419,583 B1 | 7/2002 | Crumby et al. |
| 6,431,983 B2 | 8/2002 | Acres .................... 463/25 |
| 6,435,511 B1 | 8/2002 | Vancura et al. |
| 6,435,968 B1 | 8/2002 | Torango |
| 6,456,716 B1 | 9/2002 | Arnold |
| RE37,885 E | 10/2002 | Acres et al. ............ 463/42 |
| 6,461,241 B1 | 10/2002 | Webb et al. |
| 6,511,376 B2 | 1/2003 | Walker et al. .......... 463/21 |
| 6,537,150 B1 | 3/2003 | Luciano et al. |
| 6,565,434 B1 | 5/2003 | Acres |
| 6,569,013 B1 | 5/2003 | Taylor .................... 463/13 |
| 6,589,115 B2 | 7/2003 | Walker et al. .......... 463/25 |
| 6,592,458 B1 | 7/2003 | Ho |
| 6,592,460 B2 | 7/2003 | Torango |
| 6,607,438 B2 | 8/2003 | Baerlocher et al. .... 463/16 |
| 6,607,441 B1 | 8/2003 | Acres .................... 463/25 |
| 6,620,046 B2 | 9/2003 | Rowe |
| 6,626,758 B1 | 9/2003 | Parham et al. |
| 6,634,941 B2 | 10/2003 | Olive |
| 6,645,074 B2 | 11/2003 | Thomas et al. |
| 6,645,077 B2 | 11/2003 | Rowe |
| 6,648,762 B2 | 11/2003 | Walker et al. .......... 463/25 |
| 6,656,048 B2 | 12/2003 | Olsen |
| 6,663,487 B1 | 12/2003 | Ladner .................. 463/13 |
| 6,675,152 B1 | 1/2004 | Prasad |
| 6,682,421 B1 | 1/2004 | Rowe et al. ............ 463/25 |
| 6,685,563 B1 * | 2/2004 | Meekins et al. ........ 463/25 |
| 6,702,674 B1 | 3/2004 | De Bruin et al. |
| 6,712,695 B2 | 3/2004 | Mothwurf et al. |
| 6,712,697 B2 | 3/2004 | Acres .................... 463/25 |
| 6,712,698 B2 | 3/2004 | Paulsen et al. |
| 6,722,986 B1 | 4/2004 | Lyons |
| 6,746,328 B2 | 6/2004 | Cannon et al. ........ 463/17 |
| 6,749,510 B2 | 6/2004 | Giobbi .................. 463/42 |
| 6,776,715 B2 | 8/2004 | Price |
| 6,780,111 B2 | 8/2004 | Cannon et al. ........ 463/25 |
| 6,786,819 B2 | 9/2004 | Baerlocher et al. .... 463/20 |
| 6,786,824 B2 | 9/2004 | Cannon |
| 6,790,141 B2 | 9/2004 | Muir |
| 6,800,030 B2 | 10/2004 | Acres .................... 463/25 |
| 6,805,634 B1 | 10/2004 | Wells et al. |
| 6,832,956 B1 | 12/2004 | Boyd et al. |
| 6,832,958 B2 | 12/2004 | Acres et al. ............ 463/25 |
| 6,837,788 B2 | 1/2005 | Cannon .................. 463/16 |
| 6,869,361 B2 | 3/2005 | Sharpless et al. |
| 6,887,154 B1 * | 5/2005 | Luciano et al. ........ 463/26 |
| 6,910,964 B2 | 6/2005 | Acres .................... 463/25 |
| 6,918,834 B2 | 7/2005 | Vancura .................. 463/25 |
| 6,932,707 B2 | 8/2005 | Duhamel ................ 463/42 |
| 6,939,234 B2 | 9/2005 | Beatty .................... 463/42 |
| RE38,812 E | 10/2005 | Acres et al. ............ 463/26 |
| 6,966,834 B1 | 11/2005 | Johnson ................ 463/25 |
| 6,984,173 B1 | 1/2006 | Piechowiak et al. .... 463/20 |
| 6,984,174 B2 | 1/2006 | Cannon et al. |
| 7,037,195 B2 * | 5/2006 | Schneider et al. ........... 463/25 |
| 7,056,215 B1 | 6/2006 | Olive |
| 7,108,603 B2 | 9/2006 | Olive |
| 7,127,069 B2 | 10/2006 | Nguyen |
| 7,260,834 B1 | 8/2007 | Carlson |
| 2001/0007127 A1 | 7/2001 | Staring |
| 2001/0049303 A1 | 12/2001 | Found et al. |
| 2001/0055990 A1 | 12/2001 | Acres |
| 2002/0049909 A1 | 4/2002 | Jackson et al. |
| 2002/0068631 A1 | 6/2002 | Raverdy et al. |
| 2002/0071557 A1 | 6/2002 | Nguyen |
| 2002/0116615 A1 | 8/2002 | Nguyen et al. |
| 2002/0138594 A1 | 9/2002 | Rowe |
| 2002/0152120 A1 | 10/2002 | Howington |
| 2002/0165023 A1 | 11/2002 | Brosnan et al. |
| 2002/0187834 A1 | 12/2002 | Rowe et al. |
| 2003/0027625 A1 | 2/2003 | Rowe |
| 2003/0027630 A1 | 2/2003 | Kelly et al. |
| 2003/0028480 A1 | 2/2003 | Rowe |
| 2003/0032485 A1 | 2/2003 | Cockerille et al. |
| 2003/0045350 A1 | 3/2003 | Baerlocher et al. |
| 2003/0045353 A1 | 3/2003 | Paulsen et al. |
| 2003/0050111 A1 | 3/2003 | Saffari |
| 2003/0060279 A1 | 3/2003 | Torango |
| 2003/0083943 A1 | 5/2003 | Adams et al. |
| 2003/0092477 A1 | 5/2003 | Luciano, Jr. et al. |
| 2003/0092484 A1 | 5/2003 | Schneider |
| 2003/0144965 A1 | 7/2003 | Prasad |
| 2003/0182574 A1 | 9/2003 | Whitten et al. |
| 2003/0222402 A1 | 12/2003 | Olive |
| 2003/0228904 A1 | 12/2003 | Acres et al. |
| 2003/0228912 A1 | 12/2003 | Wells et al. |
| 2003/0232647 A1 | 12/2003 | Moser |
| 2004/0009811 A1 | 1/2004 | Torango |
| 2004/0087368 A1 | 5/2004 | Gauselmann |
| 2004/0235552 A1 | 11/2004 | Gauselmann |
| 2004/0242297 A1 | 12/2004 | Walker et al. |
| 2005/0032573 A1 | 2/2005 | Acres et al. |
| 2005/0070353 A1 | 3/2005 | Webb et al. |
| 2005/0070356 A1 | 3/2005 | Mothwurf et al. |
| 2005/0079911 A1 | 4/2005 | Nakatsu |
| 2005/0086478 A1 | 4/2005 | Pienado et al. |
| 2005/0101374 A1 | 5/2005 | Acres |
| 2005/0119047 A1 | 6/2005 | Olive |
| 2005/0143168 A1 | 6/2005 | Torango |
| 2005/0176488 A1 | 8/2005 | Olive |
| 2005/0192099 A1 | 9/2005 | Nguyen et al. |
| 2005/0209004 A1 | 9/2005 | Torango |
| 2005/0209005 A1 | 9/2005 | Acres et al. |
| 2006/0025210 A1 | 2/2006 | Johnson |
| 2006/0172804 A1 | 8/2006 | Acres et al. |
| 2006/0183529 A1 | 8/2006 | Acres et al. |

FOREIGN PATENT DOCUMENTS

| | | |
|---|---|---|
| AU | 39363/78 | 3/1980 |
| AU | 66683/81 | 8/1981 |
| AU | 542455 | 10/1984 |
| AU | 555905 | 11/1984 |
| AU | 589158 | 8/1986 |
| AU | 628330 | 11/1989 |
| AU | 630112 | 3/1990 |
| AU | 649009 | 8/1991 |
| AU | 655801 | 9/1992 |
| AU | 633469 | 1/1993 |
| AU | 680920 | 8/1995 |
| AU | 70247/96 | 4/1997 |
| AU | 704365 | 4/1997 |
| AU | 704372 | 4/1997 |
| AU | 707687 | 4/1997 |
| AU | 0 7780 | 7/1997 |
| AU | 680602 | 7/1997 |

| | | |
|---|---|---|
| AU | 709724 | 8/1997 |
| AU | 0 9090 | 9/1997 |
| AU | PO 9102 | 9/1997 |
| AU | 716299 | 1/1998 |
| AU | 199662115 | 2/1998 |
| AU | 722107 | 5/1998 |
| AU | 199743615 | 5/1998 |
| AU | 721968 | 6/1998 |
| AU | 758306 | 8/1998 |
| AU | 733963 | 9/1998 |
| AU | 743079 | 11/1998 |
| AU | 748263 | 11/1998 |
| AU | 756180 | 1/1999 |
| AU | 755826 | 2/1999 |
| AU | 738686 | 3/1999 |
| AU | 749222 | 3/1999 |
| AU | 736679 | 5/1999 |
| AU | 728788 | 7/1999 |
| AU | 1999 17318 | 9/1999 |
| AU | 768285 | 9/1999 |
| AU | 753102 | 11/1999 |
| AU | 765084 | 11/1999 |
| AU | 714299 | 12/1999 |
| AU | 760617 | 1/2000 |
| AU | 744569 | 3/2001 |
| AU | 771847 | 3/2001 |
| AU | 2001100032 | 6/2001 |
| AU | 2001100033 | 6/2001 |
| DE | 3415114 | 10/1985 |
| EP | 0 342 797 | 11/1989 |
| EP | 0420586 | 4/1991 |
| EP | 0 444 932 | 10/1995 |
| EP | 0770415 | 5/1997 |
| FR | EP 1344195 | 9/2003 |
| GB | 2083936 | 3/1982 |
| GB | 2 139 390 | 11/1984 |
| GB | 2 147 773 | 5/1985 |
| GB | 2 148 135 | 5/1985 |
| GB | 2151054 | 7/1985 |
| GB | 2153572 | 8/1985 |
| GB | 2180087 | 3/1987 |
| GB | 2191030 | 12/1987 |
| GB | 2230373 | 10/1990 |
| GB | 2262642 | 6/1993 |
| JP | 5184709 | 7/1993 |
| JP | 6335560 | 12/1994 |
| JP | 7148307 | 6/1995 |
| JP | 09192289 | 7/1997 |
| JP | 09248384 | 9/1997 |
| JP | 10033829 | 2/1998 |
| WO | WO 8002512 | 11/1980 |
| WO | WO 94/12256 | 6/1994 |
| WO | WO 95/22811 | 8/1995 |
| WO | WO 95/30944 | 11/1995 |
| WO | WO 96/12262 | 4/1996 |
| WO | WO 96/24421 | 8/1996 |
| WO | WO 97/12338 | 4/1997 |
| WO | WO 9712315 | 4/1997 |
| WO | WO 97/27568 | 7/1997 |
| WO | WO 9807484 | 2/1998 |
| WO | WO 9818532 | 5/1998 |
| WO | WO 98/35309 | 8/1998 |
| WO | WO 99/03078 | 1/1999 |
| WO | WO 99/10849 | 3/1999 |
| WO | WO 99/60498 | 11/1999 |
| WO | WO 0003775 | 1/2000 |
| WO | WO 00/32286 | 6/2000 |
| WO | WO 01/10523 | 2/2001 |
| WO | WO 01/15790 | 3/2001 |
| WO | WO 01/67218 A1 | 9/2001 |
| WO | WO 02/052515 | 7/2002 |
| WO | WO 03/030066 | 4/2003 |
| WO | WO 03063019 | 7/2003 |

OTHER PUBLICATIONS

English Translation of WO 02/052515 (EP 1344195).
Excerpt from Mikohn, "Product Catalog," Chapters 1, 2, 6, 7, and 8, 64 pgs. (Jan. 1993).
Excerpt from Mikohn, "Super Controller Manual," Chapters 1-3 and 6-7, 207 pgs. (1989).
Casino Data Systems, "ProLINK Progressive Controller: User/Reference Manual," 38 pgs. (Apr. 1997).
Bueschel, Lemons, Cherries and Bell-Fruit Gum, pp. 1-4, 304-314 (Royal Bell Books, Nov. 1995).
GRIPS International, "Wide Area Progressive Link System" (website reported as archived Feb. 20, 1997) (available at http://web.archive.org/web/19970220165457/www.grips.com/wap.htm).
GRIPS International, "Integrated Real Time On-Line Slot System—SDI" (website reported as archived Feb. 20, 1997) (available at http://web.archive.org/web/19970220165559/www.grips.com/sdi.htm).
GRIPS International, "PEM—Precision Electronic Meter" (website reported as archived Feb. 20, 1997) (available at http://web.archive.org/web/19970220165753/www.grips.com/pem.htm).
GRIPS International, "Player Tracking on Slots" (website reported as archived Feb. 20, 1997) (available at http://web.archive.org/web/19970220165921/www.grips.com/playtrac.htm).
"Fast Buck Systems Manual," 52 pgs. (available to Mirage shift supervisors at least as early as May 30, 1990).
Aristocrat, "Catalogue of Champions," 4 pgs. (1990).
Aristocrat Buyer's Guide with ACES A, 2 pp. (Mar.-May 1989).
Aristocrat IDS dated Mar. 8, 2005, filed in U.S. Appl. No. 09/462,717, and referring to Surprize Gaming Machine.
Surprize Gaming Machine Advertisement, Aristocrat Leisure Industries, Australia.
"Surprize Software Specification for MV2030—var 01", Aristocrat Leisure Industries, Australia.
Acres Bonusing System User Manual, Version 4.3, 351 pp. (Feb. 15, 2000).
Atronic Casino Technology, Action Jackpot Brochure.
Atronic Casino Technology, "Action Jackpot," in *Casino Journal*, (Oct. 1996).
Australia/New Zealand Gaming Machine National Standards, Revision 1.0, 127 pp. (Dec. 1997).
Bueschel, Lemons, Cherries and Bell-Fruit-Gum, 346 pp. (Royal Bell Books, Nov. 1995).
Derby Day Ad by Atronic Casino Technology (1996).
Exhibit A cited in Information Disclosure Statements dated Apr. 16, 2007, submitted in U.S. Appl. Nos. 11/365,007, 11/365,177, and 11/445,969, entitled "Documents related to the Surprize game".
Exhibit B cited in Information Disclosure Statements dated Apr. 16, 2007, submitted in U.S. Appl. Nos. 11/365,007, 11/365,177, and 11/445,969, entitled "Documents related to the Surprize (MV2030) game".
Exhibit C cited in Information Disclosure Statements dated Apr. 16, 2007, submitted in U.S. Appl. Nos. 11/365,007, 11/365,177, and 11/445,969, entitled "Documents related to the Fast Buck game".
Exhibit D cited in Information Disclosure Statements dated Apr. 16, 2007, submitted in U.S. Appl. Nos. 11/365,007, 11/365,177, and 11/445,969, entitled "Documents related to Down-loaded System Awards Regulations".
Exhibit E cited in Information Disclosure Statements dated Apr. 16, 2007, submitted in U.S. Appl. Nos. 11/365,007, 11/365,177, and 11/445,969, entitled "Documents related to the ACES game".
Exhibit F cited in Information Disclosure Statements dated Apr. 16, 2007, submitted in U.S. Appl. Nos. 11/365,007, 11/365,177, and 11/445,969, entitled "Documents related to the Best-and-Fairest game".
Exhibit G cited in Information Disclosure Statements dated Apr. 16, 2007, submitted in U.S. Appl. Nos. 11/365,007, 11/365,177, and 11/445,969, entitled "Documents related to the Cricketer game".
Exhibit H cited in Information Disclosure Statements dated Apr. 16, 2007, submitted in U.S. Appl. Nos. 11/365,007, 11/365,177, and 11/445,969, entitled "Documents related to the Thrillions game".

Faust, "The Future of Slots," *Gaming Products & Services*, 8 pp. (Oct. 1995).
Fey, *Slot Machines: A Pictorial History of the First 100 Years*, Fourth Edition, 261 pp. (1994).
Gaming Laboratories International, "GLI-11: Gaming Devices in Casinos, Version 1.4" 93 pp. (2006).
Gaming Laboratories International, "GLI-12: Progressive Gaming Devices in Casinos, Version 1.2" 35 pp. (2006).
Legato, "Aristocrat Leisure Industries," *Casino Journal*, vol. 10, No. 1, pp. 87-89 (Jan. 1997).
Legato, "Atronic Casino Technology," *Casino Journal*, vol. 10, No. 9, 3 pp. (Sep. 1997).
Legato, "World of Slots," *Casino Journal*, vol. 9, No. 10, pp. 70-98, 145-146 (Oct. 1996).
Legato, "World of Slots," *Casino Journal*, vol. 10, No. 10, 36 pp. (Oct. 1997).
Legato, "World of Slots," *Casino Journal*, vol. 11, No. 9, 7 pp. (Sep. 1998).
Mikohn Press Release, "New York—New York Hotel & Casino Unveils New Moneytime Slot Jackpot Spectacular From Mikohn," 2 pp. (Jul. 16, 1997).
New South Wales, "Approved Poker Machines—Policy, Game Characteristics, Statistical Characteristics," vol. 1, Sec. 1, 88 pp. (Mar. 1995).
New South Wales, "Linked Progressive Jackpot Systems—Guidelines," vol. 3, Sec. 1, 61 pp. (Mar. 1995).
Nicoll, "Technical Aspects of Wide Area Gaming and Jackpots," *AIC Casinos and Gaming Conference*, 7 pp. (Feb. 24-26, 1999).
Queensland Office of Gaming Regulation, "Jackpot Systems Minimum Technical Requirements, Version 1.3," 32 pp. (Sep. 6, 2001).
Queensland Treasury Office of Gaming Regulation, "Local Area Electronic Gaming Machine Communication Protocol, Version 1.2," 64 pp. (Mar. 26, 1997).
Queensland Treasury Office of Gaming Regulation, "Local Area Electronic Gaming Machine Communications Protocol, QCOM Version 1.5," 77 pp. (Feb. 26, 1998).
Queensland Treasury Office of Gaming Regulation, "Local Area Electronic Gaming Machine Communications Protocol, QCOM Version 1.5.5," 99 pp. (Dec. 19, 2001).
Rutherford, "The Power of the Progressive," Casino Journal, 6 pp. (Apr. 1998).
Tasmanian Gaming Commission, "Internet Gaming Technical Requirements, Version 3.0," 62 pp. (Jun. 2001).
Victorian Casino and Gaming Authority, "Review of VCGA SRD for Gaming Equipment (Version 4.0) with Regard to Gaming Machine National Standards (Revision 1.0)," 72 pp. (Dec. 1997).
Victorian Casino and Gaming Authority, "Technical Requirements for Gaming Machines and Electronic Monitoring Systems in the Melbourne Casino," Version 3.0, 84 pp. (Jul. 10, 1996).
Canadian Office Action dated May 8, 2008, for corresponding Canada Application No. 2,425,881.
Canadian Office Action dated Jun. 9, 2006, for corresponding Canada Application No. 2,425,881.
Australian Examination Report dated Jul. 24, 2006, for corresponding Australia Application No. 2002331915.
Australian Examination Report dated Jul. 17, 2006, for corresponding Australia Application No. 2002331915.
Australian Examination Report dated May 10, 2006, for corresponding Australia Application No. 2002331915.
Australian Examination Report dated Jul. 27, 2005, for corresponding Australia Application No. 2002331915.
Australian Examination Report dated Oct. 26, 2004, for corresponding Australia Application No. 2002331915.
British Examination Report dated Aug. 23, 2005, for corresponding British Application No. GB0309119.6.
British Examination Report dated May 26, 2005, for corresponding British Application No. GB0309119.6.
British Examination Report dated Oct. 29, 2004, for corresponding British Application No. GB0309119.6.
International Search Report dated Sep. 15, 2003, for corresponding PCT Application No. PCT/US2002/30858.
AU Office Action dated Feb. 5, 2008 from Australia Application No. 2006204618.
U.S. Office Action mailed Sep. 20, 2004, from U.S. Appl. No. 10/664,514.
U.S. Office Action mailed Mar. 8, 2005, from U.S. Appl. No. 10/664,514.
U.S. Office Action mailed Jan. 22, 2009 from U.S. Appl. No. 10/664,514.
U.S. Office Action mailed Jun. 14, 2007 from U.S. Appl. No. 10/783,122.
CA Office Action mailed Nov. 3, 2008 from Canada Application No. 2,425,881.
Digital Signature Standard (DSS), Federal Information Processing Standards Publication 186 [online], May 19, 1994 [retrieved Dec. 17, 2007]. Retrieved from the Internet: URL:http://www.itll.nist.gov/fipspubs/fil_186.htm.
CA Office Action dated Jul. 31, 2009 from Canadian Application No. 2,489,880.
CA Office Action dated Nov. 3, 2008, for corresponding Canada Application No. 2,489,880.
U.S. Office Action mailed Jul. 31, 2009, U.S. Appl. No. 10/664,514.
U.S. Office Action mailed Jan. 22, 2009, U.S. Appl. No. 10/664,514.
U.S. Office Action mailed Jun. 18, 2009, from U.S. Appl. No. 10/783,122.
U.S. Office Action mailed Jun. 14, 2007, from U.S. Appl. No. 10/783,122.
Australian first Office Action dated Dec. 10, 2009 issued in Application No. 2004240246.
U.S. Notice of Allowance and Allowed Claims mailed Feb. 19, 2010, from U.S. Appl. No. 10/664,514.
U.S. Notice of Allowance and Allowed Claims mailed Jan. 27, 2010 from U.S. Appl. No. 10/783,122.
Campbell, R., Computa Game—Equipment Manual, Revision 1, Sep. 1990.
Davies, C et al., Computa Game—The Software Manual, Revision 3, Jul. 1991.
Mikohn, Money Time Ad, 1999.

\* cited by examiner

SYSTEM FOR AWARDING A BONUS TO A GAMING DEVICE ON A WIDE AREA NETWORK

CROSS REFERENCE TO RELATED APPLICATIONS

This application claims priority from provisional application U.S. 60/326,030 titled "SYSTEM FOR AWARDING A BONUS TO A GAMING DEVICE ON A WIDE AREA NETWORK", filed Sep. 28, 2001, the contents of which are hereby incorporated herein for all purposes.

1. FIELD OF THE INVENTION

The present invention relates to awarding a bonus on a network of gaming devices, and—more particularly—awarding such a bonus on a wide area network.

2. BACKGROUND OF THE INVENTION

Many casino operating companies own multiple casinos in several locations. It has proved to be advantageous for such companies to devise player loyalty promotions that span these properties. Historically, multi-property player management systems accumulate player activity across all properties. For example, many casinos track a player's total wagers, theoretical win, actual win, complementary balance, player point balance, and other key player behavior statistics across all casinos managed by that operator.

This information may be used to determine a global worth of the player to the operator, as opposed to a single playing location. Many casino operators accomplish this by dividing their player database into tiers, with the highest tier being the most valuable players and the lowest tier being the least valuable players from the casino's perspective. The casino typically uses a statistic such as theoretical win to establish player worth. Once this global player worth is established, casinos target promotional offers commensurate a player's worth. The promotions are designed to entice further play at one or more of the operator's casinos.

The promotions usually take advantage of the multi-property nature of the business, such as allowing redemption of promotions at all casinos; targeting redemptions to a single property that might have more capacity that other properties; and using a complementary trip to a more desirable property as a promotional offer All of these generally rely on manual processes for communication of promotional information to the customers and for redeeming promotions. For example, promotional offers are generally communicated via direct mail to qualifying players, or via brochures, signage and literature at a casino. Further, redemption of promotional offers—whether they are cash, complementaries, etc.—is generally done manually at a players-club booth at each casino.

SUMMARY OF THE INVENTION

As used herein, the term bonus is an award, e.g., like the promotional offer, given to a player of an electronic gaming machine (EGM). The term bonus herein refers to any such award that is not paid by the device in accordance with its pay table. Such bonuses and systems for implementing them are described in U.S. Pat. No. 5,655,961 (the '961 patent) and in U.S. patent application Ser. No. 08/843,411, now U.S. Pat. No. 6,319,125,both of which are hereby incorporated herein by reference for all purposes. Also hereby incorporated by reference for all purposes is U.S. Pat. No. 6,375,569, which describes a bonus promotion like the one described herein, except implemented at a single casino. A bonus can include an award of cash or machine credits, player points, or complementary amenities.

In a first implementation of the present invention, as participating EGMs are played, a user-selected percentage of the play is added to a common bonus pool. When the pool reaches a randomly selected level of play, between specified minimum and maximum numbers, a winner is randomly selected. The award can be a fixed cash amount, a cash amount linked to the bonus pool total or a non-cash prize. Prizes that are typically smaller than the winning bonus can also be awarded to non-winning players.

In the preferred embodiment, a master server, located at one of a plurality of participating casinos, communicates over a wide area network with slave servers located at each participating casino. The preferred embodiment may support a master server, up to 32 slave servers, and may accommodate as many as 16 different bonus pools that operate to pay a bonus award to one of the EGMs associated with the respective pools. It should be appreciated that other embodiments could support more or less slave servers and bonus pools. For each bonus pool, the master server selects a winning slave server, which in turn selects a winning EGM.

The preferred embodiment is called the Random Rewards® promotion. The promotion is complete when the amount of play on participating EGMs reaches the randomly selected number between the minimum and maximum numbers, which are specified at the master server. The randomly selected number is called the lucky number. Preferably a player must be issued a player-tracking card to be eligible to participate. Although the invention is not so limited, a typical implementation is for a plurality of casinos that are commonly owned with each recognizing a player-tracking card issued by any of the others. As a result, player activity is tracked—in a known manner—across all of the casinos.

DETAILED DESCRIPTION OF THE PREFERRED EMBODIMENTS

Figure 1:
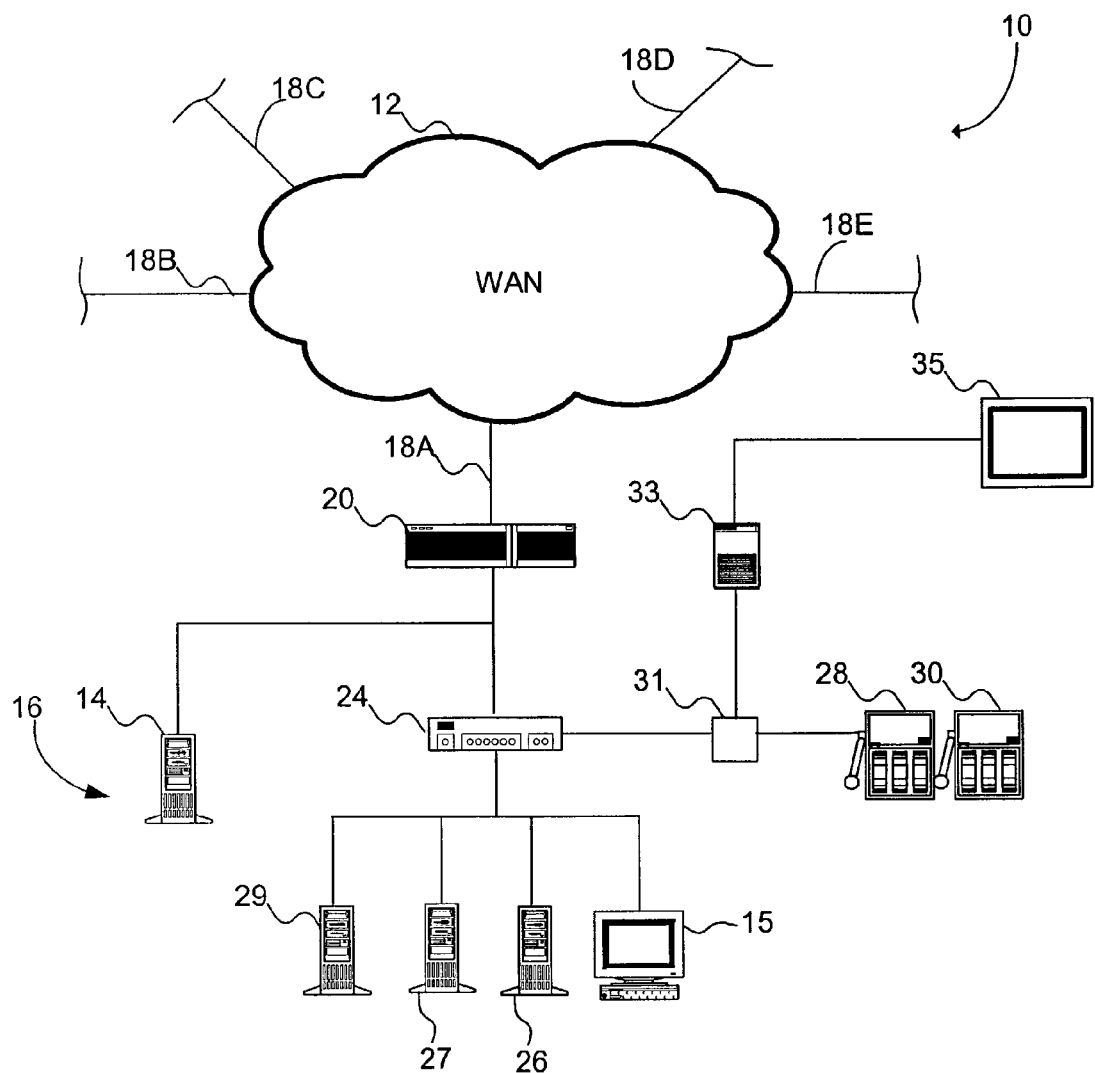
FIG. 1 is a schematic diagram of a multi-property bonus system implemented in accordance with the present invention.

Turning now to FIG. 1, indicated generally at 10 is a system constructed in accordance with the present invention. It includes a wide-area network (WAN) 12 that incorporates a single master server 14. Also included in the WAN is a configuration workstation 15, including a keyboard, monitor, and software, that permits a user of the workstation to configure the master server. Portions of WAN 12 are located at different casinos, one of which is depicted generally at 16. Each casino includes a local area network (LAN), like LAN 18a at casino 16. LAN 18a includes a router 20; a concentrator 24; a slave server 26, which—among other things—tracks carded EGM play in a known manner; a player server 27, which provides messages to displays associated with the EGMs; a key distribution center 29 (KDC), which implements security as will be described; and a plurality of EGMs, only two of which are exemplary slot machines 28, 30. In addition, a bank controller 31 facilitates communication between slot machines 28, 30 and concentrator 24. Bank controller 31 provides the same function for an animation computer 33, which generates animated content that appears on a display 35.

The same components (except for a master server, like master server 14) appear in LANs 18a, 18b, 18c, 18d and 18e (not shown) at each of the other casinos (also not shown) on the WAN. It should be appreciated that the master server may also be located at a site remote from any of the participating casinos, or—as in the present embodiment—at one of the casinos; specifically, master server 14 is located at casino 16. Although specified network structure is depicted, the invention can be implemented on any suitable network, regardless of its design or the hardware with which it is implemented.

Router 20 transmits data packets between the master server and each slave server over WAN 12. Depending on topography of the network, a hub could be used in lieu of router 20.

Concentrator 24 is a network device similar to a hub that provides communication routing for devices on the network.

As described in the '961 patent, each EGM at each casino includes a communication board. This board, among other things, receives bonus promotion and message information from bonus servers and sends EGM meter information, among other things, to network computers, including the slave server, like slave server 26.

Consideration will now be given to configuration of master server 14, which must be undertaken before play can begin. Master server 14 is configured at workstation 15 with a user-specified contribution rate that EGMs contribute to the growth of a bonus pool, which is called the current pool. In general terms, as participating EGMs are played, the current pool is incremented by the contribution rate multiplied by the total play on the EGMs. When the current pool reaches or exceeds the lucky number, the master server randomly selects a winning slave server. The winning slave server then randomly selects the winning EGM. EGMs that require different denominations to play can be incorporated into the same pool using known techniques to account for the difference in denominations from game-to-game within the pool.

In the multi-casino Random Rewards® promotion, selecting minimum and maximum numbers at master server 14 specifies the range from which the winning number is selected. The range corresponds to a level of play by the participating EGMs; the total current pool results from all plays made on all EGMs participating in the multi-casino promotion. Master server 14 is also configured with a list of all slave servers participating in the promotion. The current pool represents the combined contributions of each slave server. Each slave server pool total further represents the combined contribution of all EGMs participating in the promotion at the associated slave server's casino.

Each slayer server is also configured, primarily by designating which EGMs are linked to a particular bonus pool. The slave servers are also configured using their associated workstation, like server 26 is configured by workstation 15. Each local configuration workstation can be used to configure the master server and the associated local server, but a workstation at one location cannot be used to configure a slave server at another location.

Figure 2:
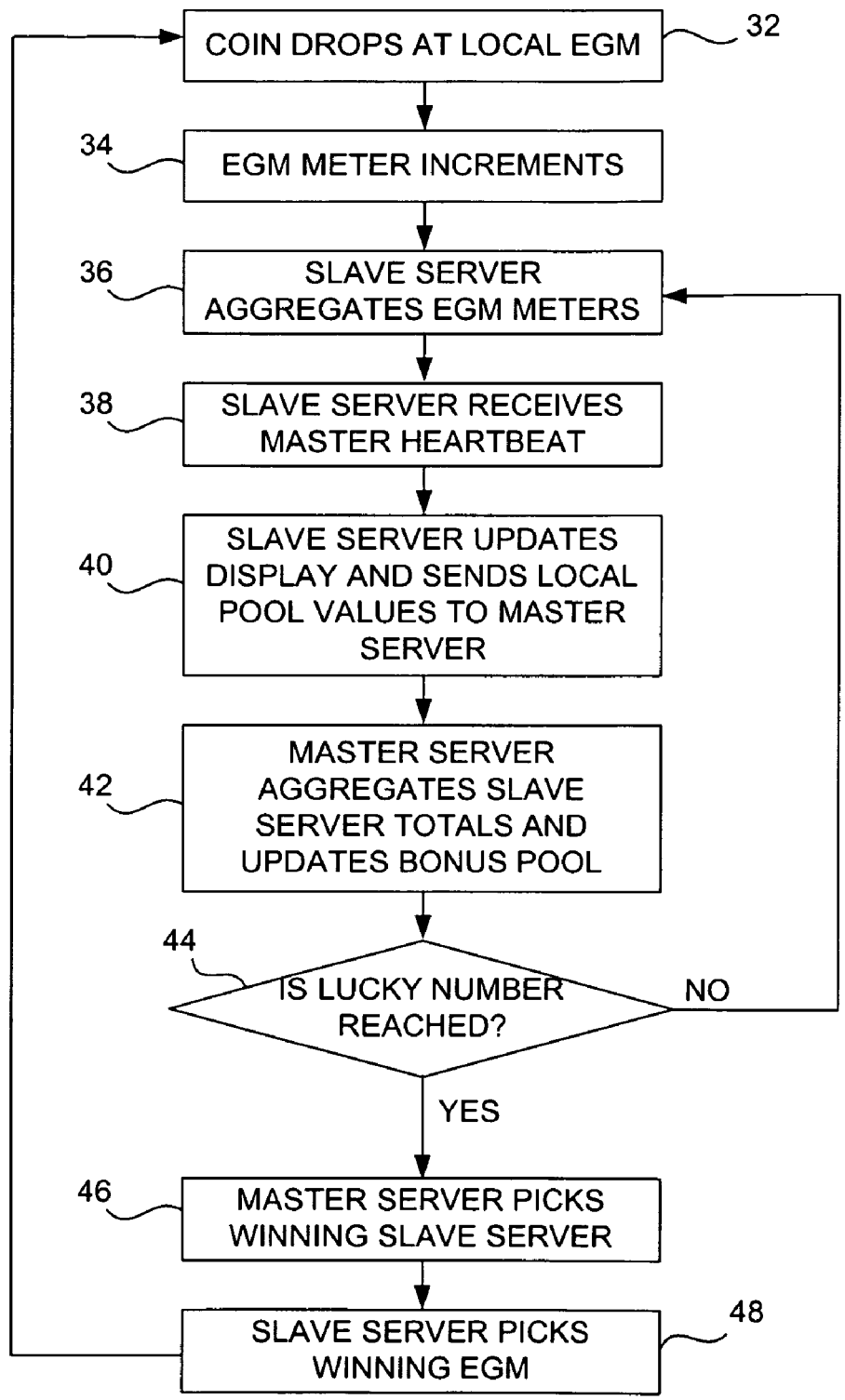
FIG. 2 is a flow chart depicting some of the operation of the system depicted in FIG. 1.

Consideration will now be given to operation of system 10, with reference to the flow chart of FIG. 2, after the master and slave servers are configured as described above. As EGMs are played in step 32, their respective meters increment in step 34. In a step not depicted in FIG. 2, prior to initiation of a bonus pool, the master server transmits the pool contribution rate—a typical rate being in the 0.001% to 3% of all coin-in—to each slave server. In step 36, each slave server aggregates meter information from each EGM in its associated casino. Master server 14, whose identity is unknown to the slave servers, sends a display message on a periodic basis—in step 38—that includes the total accrued value of the bonus pool to slave servers. This message operates like a heartbeat. With each such transmission, the slave causes the total bonus pool—accrued from all participating casinos—to be displayed, either on displays associated with each EGM or on overhead display 35, or both. The slave servers respond, in step 40, to each heartbeat message by (a) causing the updated value of the total bonus pool to be displayed and (b) sending their new local pool values to the master server. In the present embodiment, the heartbeat occurs approximately every 5 seconds, but this period can be adjusted upwardly or downwardly.

In the present example, the meter specified at master server 14 to track play is one created for this bonus, namely a carded coin-in meter. This meter counts all coin into the EGM that has a player associated with the EGM as a result of the player's player-tracking card being inserted into a card reader associated with the EGM.

Other meters, such as the coin-in meter, the game meter, the win meter, or another created meter can also be used. Each slave server is updated every half-second with data identifying each EGM whose coin-in meters advanced in the preceding half second and the amount of advance by each. From this the slave server calculates the total coin in for the period and multiplies this times the contribution rate to produce a number equal to the total accrued contribution by that slave server, and therefore its associated casino, since the current pool began accruing. This local pool value is the number transmitted over the WAN in step 40 to the master server.

The slave servers send the total accrued contribution of the casino—i.e., the local pool value—rather than incremental changes to reduce the negative effects caused by communication errors. Sending totals reduces problems arising from packets lost during transmission and obviates the need to reset or synchronize with the master server during increment processing. The master server then compares the new slave pool total with the previous slave pool total (even if power outages or other difficulties prevented transmission of packets for one or more heartbeats) to determine the amount of change, which it then adds to the current pool in step 42. When the current pool reaches the lucky number—in step 44—the winner is selected. If the lucky number is not reached, play and processing continues as shown.

Once the lucky number is reached, the master server determines a winning slave server in step 46. The winning slave server is chosen randomly among slave servers generating local pool increases responsive to the heartbeat that caused the current pool to exceed the lucky number. The random selection, however, is weighted proportionate to the local pool contribution reported by each casino when a winning slave server is chosen. In other words, casinos that generate larger wagers or more play advance the lucky number count more, and are therefore more likely to reach the lucky number.

Once the master server has randomly selected a winning slave server, the master server sends point-to-point messages to each slave server identifying the winning slave server. The winning slave server then identifies a winning EGM—in step 48—also based on a weighted random process. It selects the next half-second of updated play data (described above) to randomly choose a winning EGM from those that had a coin-in event in the selected play data. The random selection is, however, weighted to give a proportionately greater chance of winning to EGMs as a function of the amount of the wager. In other words, the bigger the wager, the more likely it is that an EGM will be selected. The winning EGM pays the bonus, in response to a command from the slave server, and updates its history record. The selected EGM may, but need not, be locked to prevent further play. The EGM may be locked in different ways, depending upon system configuration. First, the user may check a box in a panel appearing on the display of workstation 15 that requires each EGM to lock up whenever the EGM is a Random Rewards® winner. Second, if the box is not checked, an award may or may not be locked up. The EGM manufacturer configures the EGM for a maximum jackpot payable on the EGM credit meter. If the Random Rewards® payment is below that maximum, the payment is paid to the credit meter, from which it can be wagered or cashed out. If the payment is greater than the maximum, the machine is locked up.

In another aspect of the invention, one or more slave servers can be configured to award another bonus, preferably the Celebration Prizes® promotion, when a Random Rewards® winner is selected. In the Celebration Prizes® promotion, the slave server can be designated to award preselected EGMs a bonus when a Random Rewards® winner is selected. Only EGMs that are linked to the bonus pool that includes the winner are eligible for the Celebration Prizes® payment. Each slave server can be set to provide the Celebration Prizes® promotion, or not, and each property that provides it can set criteria establishing which of the eligible EGMs are awarded a Celebration Prizes® bonus. For example, of the eligible EGMs, Celebration Prizes® winners might be only those with a player's card in, or those whose last bet was a maximum bet, or those who registered a coin drop within a predetermined period of time, or some combination of these or other criteria.

Following payment to the selected EGM, the bonus promotion is continuously repeated. One or more of the bonus pools can be modified by either ending it or making changes to its parameters, such as the contribution rate and the minimum and maximum numbers that define the range from which the lucky number is randomly selected. Commands to modify a pool are entered at workstation 15. The modifications are effective immediately, modifying the current pool. In an alternative embodiment, the modifications are not implemented until after a Random Rewards® winner is selected for the current game associated with the pool to be modified. The commands set a flag, which implements a process after the current game. As a result, the modifications are made commencing with the next game associated with the modified pool.

A new bonus promotion begins by subtracting the lucky number from the current pool, and creating a new current pool by adding a base amount, which is the minimum number for the lower end of the range from which the lucky number is selected; a hidden pool; and a delayed pool (both described below) that are accrued from prior games.

For example, assume that the minimum pool level (base amount) is $1000 and the hidden pool increment rate is 2%. After $2000 of play, the hidden pool value is at $40. If the promotion selects a winner at this point, the sum of the base amount and the hidden pool is $1040, which is put into the current pool. After summing, the hidden pool is reset to zero.

After an award is given and the current pool is established as described above, the hidden pool and the current pool are each adjusted by the delayed pool (described below), and a new lucky number is set between the value of the current pool and the maximum number.

The master server and the slave servers each maintain a delayed pool, which is not displayed to bonus promotion participants and does not contribute to the growth of the current pool during the current promotion. The slave delayed pool is comprised of play on eligible EGMs that were not able to contribute to the bonus. For example, if communication between an EGM and a slave server were lost for a period of time, restoration of communication could cause an immediate large incremental contribution from the EGM resulting from sudden realization of accrued off-line contributions. The restored EGM therefore has a disproportionate opportunity to win the bonus because of the weighting of play involved in the selection of the winning EGM.

When an EGM goes off-line and shows an increment to the slave server after coming back on-line, the total increment goes into the slave server's delayed pool. In other words the delayed pool at each slave server is not multiplied by the contribution percentage; the entire amount of wagers that occurred off-line goes into each slave server's delayed pool. The value of the delayed pools is accrued at each slave server and periodically transmitted to the master server, which maintains the total accrued delayed pool.

The master server's delayed pool works much like the slave servers. The master server delayed pool is comprised of two components. The first component is the delayed pool contributions in dollars from disrupted EGMs. The second component is slave server contribution totals that were not able to contribute to the bonus, again perhaps because of communication difficulties between the slaves and the master. As will be recalled, these totals have already been multiplied by the contribution percentage. As a result, when communication is restored, this component cannot be added directly into the first component of the master server delayed pool. Rather, these totals must be divided by the contribution rate to convert them back to dollars.

The contribution rate, however, can vary from one bonus promotion to the next. The master server must therefore undo the calculation previously applied by the slave server prior to reporting to the master by dividing the slave's accrued contribution by the user-selected percentage from the previous bonus promotion to determine the actual dollars played while the slave server was off-line. The increment in these actual dollars that accrued before the slave went off-line is then added to the delayed pool.

Once the master server has the actual dollars played in the delayed pool—derived from the slave's delayed pools and from undoing the pool contribution calculations as just described—it is distributed to both the new current pool and hidden pool using increment rates defined for the current and hidden pools. As a result, the base amount, and the hidden and delayed pools provide the initial funding for the new bonus pool.

If applying the percentage of the delayed pool to the current pool puts the current pool over 90% of the range between the minimum and maximum numbers, the amount applied from the delayed pool to the current pool is set to 90% of this range. This defines the minimum number and creates a relatively narrow range from which the lucky number is selected. In other words, the current pool is likely to hit a winner in a relatively short time. As the games continue, the amount applied from the delayed pool to each new current pool is limited in the same fashion until the applied percentage from the delayed pool is less than 90% of the range.

It should be appreciated that the amount of the award can be the lucky number. Or it can be a fixed amount or a noncash award, such as a car or the like.

Consideration will now be given to the features that enhance security in system 10. Generally speaking, key distribution center 29 (KDC), manages different types of keys, which will be shortly described, to encrypt digital messages on each LAN, like LAN 18A, and between each LAN and master server 14. Generally speaking, three different types of keys are used in system 10: a setup key, a master node key, and a session key. These keys are used, as will be shortly described, to authenticate and verify messages on the WAN and the LAN. Every message between master server 14 and each of the slave servers, like slave server 27, is authenticated with a signature. Likewise, all messages that authorize a bonus payment between each of the slave servers and the communications boards in their associated slot machines, like slot machine 28, 30, are also signed to authenticate the message.

Consideration will first be given to the setup key, which is a single identical key shared by each of the participating nodes, namely, each slave server, like slave server 27; master server 14; and each of the communication boards in the slot machines, like slot machines 28, 30, that may be selected to participate in the Random Rewards® bonus. The setup key can be installed by installing it in firmware associated with each node. This installation may be accomplished in several ways, including simply including it during the manufacturing or installation process in firmware memory. Preferably, one half of the setup key is encoded on each of two separate magnetic-strip cards. The setup key is then installed by requiring two individuals to swipe each card at each of the nodes, thereby downloading the setup key at each node. This procedure enhances security of the setup keys.

Next, each participating node uses the setup keys to generate a master node key that is a private key shared only between KDC 29 and the node in question. In other words, the KDC generates and stores a private key-pair between the KDC and each participating node in the entire WAN.

Shortly after each node receives the setup key, whether installed in firmware at the outset or installed after system 10 becomes operational, the node sends a request for creation of a master node key to KDC 29. This message is authenticated using a message digest encrypted with the setup key. KDC 29 responds by randomly generating a master node key that is encrypted using the setup key and a 64-bit International Data Encryption Algorithm (IDEA™) Cyphertext Feedback (CFB). This message is also authenticated using a message digest encrypted with the setup key.

The requesting node then sends another message to the KDC, which generates a node table entry and stores the master key for that node. This message is authenticated using a message digest encrypted with the master node key. Thereafter the KDC sends a final message to the requesting node that causes it to remove all memory containing the setup key. This final message is authenticated using a message digest encrypted with the master node key.

The final key, the session key, is implemented by the KDC when it first starts up and periodically thereafter as will be shortly described. A counter, known as the session index, is associated with each session key. Each time the KDC changes session keys, it increments this counter. Whenever a node stores the session key, it associates it with the key counter and makes the key counter part of every message it encrypts. As a result, the receiving node can determine which session key was used for encryption. This is important during the time when session keys are changing, since not all nodes switch simultaneously. All nodes are periodically informed of the current session key index through a plain text message the KDC broadcasts across the entire WAN every 10 seconds. When a node detects that the broadcast session key index identifying the current key is different from the index it has stored, it requests the new session key using a session key request procedure. Once it receives the new session key, the old session key is discarded. This procedure accommodates new devices, devices that have been offline when the period for changing the session key passes (described below), and other situations in which a node does not have the current session key.

The procedure for requesting the session key starts when the requesting node sends a plain text request to KDC 29 requesting the new session key. The KDC responds with a message confirming the request authenticated using the master node key. The node responds by sending a message authenticated using the master node key. This causes the KDC to send the new session key encrypted using the master node key with a 64-bit IDEA™ CFB. It is likewise authenticated using the master node key.

In the present embodiment of the invention, the transmitting node, whether it is the master or slave server, generates the signature by computing the Secure Hash Algorithm (SHA1) over the entire contents of the message. The SHA1 results are then encrypted with a 64-bit International Data Encryption Algorithm (IDEA™) and the current session key.

It can be seen that all messages containing accumulated game play, which the master server uses to maintain the pool, and all pay commands from each slave server to its associated slot machines, are digitally verified and authenticated. As a result, the security of system 10 is greatly enhanced.

In one aspect of the present invention, the user, via configuration workstation 15 can generate an input command to set the period for changing the session key and can modify the period by preselecting a range above and below the selected period during which the session key is randomly distributed. For example, if the user selects 600 minutes as the period for changing the session key, and the range is 10, the session key remains valid for between 590 and 610 minutes. At a randomly selected time between 590 and 610 minutes after the session key is established, a new session key is distributed. This feature further improves system security.

Also, the user, via the configuration workstation, can remove a node from the system when there is a security breach. Similarly, the user can use the configuration workstation to enter a command that overrides the automated changing of the session keys just described to require that a new session key be immediately distributed. Both of these features further enhance system security.

The present embodiment has been illustrated with a single master server having multiple slave servers connected via a WAN. More than one master server could implement bonuses on the same WAN. In other words, another master server could be added to the WAN. The additional master would have its own slave servers and maintain bonus pools that are separate from the other master or master servers.

Finally, consideration will be given to payment of other bonuses, such as promotional awards, in addition to the Random Rewards® promotion described above. The present invention can implement direct payment of these rewards across multiple properties at the slot machine including, e.g., direct transfers of redeemable credits to the slot machine; direct transfers of non-redeemable credits to the slot machine (Xtra Credit®), as described in U.S. patent application Ser. No. 09/134,598, filed Aug. 14, 1998, now U.S. Pat. No. 6,371,852, which is hereby incorporated by reference for all purposes; and temporary change of the machine award schedule.

As in the existing single property implementations, the extension of bonusing concepts to the multi-property environment also allows more streamlined communication of promotional information. Instead of, or in addition to, more traditional communication methods such as direct mail or brochures, direct communication of promotional information can occur at the slot machine.

In addition, several features and functions that rely on the multi-property aspect can be implemented by the present invention. For example:

- To stimulate visitation at some subset of properties a bonus delivered at the machine could be earned only by playing qualifying amounts at several specified casinos
- To simulate play at a given property earning an award at one casino and stipulating redemption or payment only at another casino.
- To stimulate cross-property play, players qualify for special rewards only after hitting specified special game outcomes at some subset of properties The present invention can also be implemented to automate delivery of promotional, loyalty-based bonuses at multiple casinos on a WAN as described herein. Such a system has the following characteristics:

- Players are assigned an account number and are provided with some means to identify themselves to the system during each play session. A typical method is the use of a magnetically encoded card that is read by a card reader built into each slot machine.
- During a play session, the system records pertinent statistics, such as coins wagered, coins won, coins paidout, etc. The system stores these statistics for each player.
- This stored information includes play at all locations
- This composite information containing all play information is used as one factor in determining a patron's eligibility for participation in loyalty bonus award programs.
- In addition to enterprise-wide points and complementary awards, balances in the system also store various enterprise wide bonus balances. These bonus balances are accessible at all properties. Examples of this might be: Xtra Credit® balance, referred to above.
- Personnel Progressives® balance: the current amount of a player specific pool that accrues as a set percentage of total dollars wagered. The player watches the pool grow. When the pool reaches a certain level a bonus prize is awarded from the pool.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A method for awarding a bonus to a player of an electronic gaming device at one of a plurality of gaming properties, said method comprising:

collecting data relating to gaming device play at the properties by a slave server on a computer network;

compiling at least some of the data collected from the properties by a master server on a network including the slave servers for the purpose of awarding a bonus from a bonus pool, wherein compiling at least some of the data comprises maintaining a delayed pool representing bonus pool contributions by gaming devices while communications between the gaming devices and a slave server or between the slave server and the master server were interrupted, wherein compiling at least some of the data further comprises updating the bonus pool using a first portion of the delayed pool and forming a new bonus pool using a second portion of the delayed pool;

sending a display message from the master server to the slave servers to cause the amount of the bonus pool to be displayed and in response to receiving a display message, sending a message to the master server from a slave server indicating a current local bonus pool value so that the amount of the bonus pool is updated, the current local bonus pool value representing the total accrued contribution by the slave server since the current pool began accruing;

using the master server to randomly select a slave server from a plurality of slave servers to award the bonus and to notify the non-selected slave servers of the identity of the selected slave server;

randomly selecting at least one of the gaming devices from a plurality of gaming devices at one of the properties to receive the bonus using the selected slave server;

awarding the bonus to the player of said at least one gaming device;

generating an indication that the player has been awarded the bonus.

2. The method of claim 1 wherein said at least one gaming device is selected, at least in part, independently of a pay table for said at least one gaming device.

3. The method of claim 1 wherein said method further includes:

selecting additional electronic gaming devices at substantially the same time as said at least one gaming device is selected; and awarding bonuses to the players of said additional electronic gaming devices.

4. The method of claim 3 wherein the bonuses awarded to said additional electronic gaming devices are less than the bonus awarded to said at least one gaming device.

5. The method of claim 1 wherein said method further includes identifying at least some of the players of the gaming devices and selecting said at least one player only from identified players.

6. The method of claim 5 wherein said method further includes tracking coin in at each gaming device having an identified player and wherein compiling at least some of the data includes compiling coin in at each gaming device having an identified player.

7. A method for awarding a bonus to a player of an electronic gaming device at one of a plurality of casino properties, said method comprising:

defining a group of gaming devices at each property;

defining a count that increments responsive to play on a gaming device;

accumulating the count for each group at each property using a slave server;

accruing a percentage of the accumulated count for all of the properties in a bonus pool from which the bonus is to be awarded using a master server;

maintaining a delayed pool representing bonus pool contributions by gaming devices while communications between the gaming devices and the slave server or between the slave server and the master server were interrupted;

updating the bonus pool using a first portion of the delayed pool and forming a new bonus pool using a second portion of the delayed pool;

sending a display message from the master server to a slave server to cause the amount of the bonus pool to be displayed and in response to receiving a display message, sending a message to the master server from the slave server indicating a current local bonus pool value so that the amount of the bonus pool is updated, the current local bonus pool value representing the total accrued contribution by the slave server since the current pool began accruing;

randomly selecting a slave server from a plurality of slave servers to award a bonus and notifying the non-selected slave servers of the identity of the selected slave server; and awarding a bonus from the bonus pool to at least one of the players of a gaming device in a group of gaming devices at one of the casino properties by use of the selected slave server.

8. The method of claim 7 wherein said bonus is awarded, at least in part, independently of a pay table in the gaming device played by said at least one of the players.

9. The method of claim 7 wherein said method further includes awarding additional bonuses to players at substantially the same time as awarding a bonus from the bonus pool to said at least one of the players.

10. The method of claim 9 wherein the additional bonuses are less than the bonus awarded to said at least one of the players.

11. The method of claim 7 wherein said method further includes identifying at least some of the players of the gaming devices and wherein awarding the bonus to said at least one of the players comprises awarding the bonus to an identified player.

12. The method of claim 11 wherein said method further includes tracking coin in at each gaming device having an identified player and wherein accruing a percentage of the accumulated count comprises accruing only coin in at each gaming device having an identified player.

13. A method for awarding a bonus to a player of an electronic gaming device at one of a plurality of casino properties, said method comprising:

selecting a random number between a minimum and a maximum number;

accumulating a coin count on a slave server related to play on predetermined gaming devices at the properties for the purpose of awarding a bonus from a bonus pool;

maintaining a delayed pool representing bonus pool contributions by gaming devices while communications between the gaming devices and the slave server or between the slave server and the master server were interrupted;

updating the bonus pool using a first portion of the delayed pool and forming a new bonus pool using a second portion of the delayed pool;

sending a display message from a master server to a slave server to cause the amount of the bonus pool to be displayed and in response to receiving a display message, sending a message to the master server from the slave server indicating a current local bonus pool value so that the amount of the bonus pool is updated, the current local bonus pool value representing the total accrued contribution by the slave server since the current pool began accruing;

using the master server to randomly select a slave server from a plurality of slave servers to award a bonus and to notify the non-selected slave servers of the identity of the selected slaver server;

randomly selecting at least one of the gaming devices from a plurality of gaming devices at the property having the randomly selected slave server to receive a bonus; and awarding the bonus to a player of the randomly selected gaming device when the accumulated count reaches or exceeds the random number.

14. The method of claim 13 wherein accumulating a coin count related to play on the predetermined gaming devices at the properties comprises:

accumulating the coin count of each slave server on the master server.

15. The method of claim 13 wherein random selection of one of the slave servers is weighted based on the coin counts accumulated by each slave server.

16. The method of claim 13 wherein random selection of one of the gaming devices is weighted based on coin counts accumulated by each gaming device at the property having the randomly selected slave server.

17. The method of claim 13 wherein said method further includes identifying at least some of the players of the gaming devices and awarding a bonus to the player of the randomly selected gaming device comprises awarding the bonus to an identified player.

18. The method of claim 17 wherein said method further includes tracking coin in at each gaming device having an identified player and wherein accumulating a coin count comprises accumulating coin in at each gaming device having an identified player.

19. A system for awarding a bonus to at least one player of an electronic gaming device at one of a plurality of gaming properties, said system comprising:

a slave server at each property, said slave server being on a network of gaming devices at its associated property and being programmed to accumulate a count related to play on the networked gaming devices;

a master server on a network of the slave servers, said master server being programmed to accumulate the count of each slave server for the purpose of awarding a bonus from a bonus pool, said master server being programmed to maintain a delayed pool representing bonus pool contributions by gaming devices while communications between the gaming devices and the slave server or between the slave server and the master server were interrupted, said master server being programmed to update the bonus pool using a first portion of the delayed pool and to form a new bonus pool using a second portion of the delayed pool; and the master server configured to send a display message to the slave servers to cause the amount of the bonus pool to be displayed and in response to receiving a display message, the slave servers being configured to send a message to the master server indicating a current local bonus pool value so that the amount of the bonus pool is updated, the current local bonus pool value representing the total accrued contribution by the slave server since the current pool began accruing, and wherein the master server is also configured to randomly select one of the slave servers to award the bonus to at least one player of a gaming device of a group of gaming devices at one of the properties when the accumulated count on the master server reaches or exceeds a random number and to notify the non-selected servers of the identity of the selected slave server.

20. A method of accounting for a pool of money accumulated from play on electronic gaming devices at least one casino property comprising:

periodically checking a communications link with an electronic gaming device for an updated contribution value, the updated contribution value representing the total accrued contribution by the slave server since the current pool began accruing;

accumulating the updated contribution value into the pool;

continuing to accumulate updated contribution values from the electronic gaming devices, even if the communications link from one of the electronic gaming devices is impaired;

allocating the contribution value from an electronic gaming device having a previously impaired communication link, during the time the link was impaired, to a delayed pool;

awarding a bonus from the current pool wherein a chance of receiving the bonus is a function of an amount wagered and;

establishing a new pool using at least part of the delayed pool.

21. A method for awarding a bonus to a player of an electronic gaming device at one of a plurality of gaming properties, the method comprising:

collecting, by a plurality of slave servers in communication with respective pluralities of gaming devices, data relating to gaming device play at one or more of the plurality of gaming properties;

compiling, at a master server in communication with the slave servers, at least some of the data relating to gaming device play to form a bonus pool for awarding a bonus;

sending a display message from the master server to the slave servers, the display message causing the amount of the bonus pool to be displayed;

receiving, at the master server, a plurality of response messages sent from the slave servers in response to receiving the display message, each of the response messages indicating a current local bonus pool value associated with the respective slave server, the current local bonus pool value representing the total accrued contribution by the respective slave server since the current pool began accruing;

receiving, at the master server, at least one message from a slave server indicating a delayed pool value, the delayed pool value representing bonus pool contributions by gaming devices while communications between the gaming devices and the slave server or between the slave server and the master server were interrupted;

updating the bonus pool at the master server using the current local bonus pool values indicated in the response messages and a first portion of the delayed pool value;

randomly selecting, at the master server, a slave server from the plurality of slave servers to award the bonus;

notifying the plurality of slave servers, including the non-selected slave servers, of the identity of the selected slave server;

randomly selecting at least one of the gaming devices in communication with the selected slave server to receive the bonus;

awarding the bonus to the player of the at least one gaming device;

generating an indication that the player has been awarded the bonus; and forming a new bonus pool using a second portion of the delayed pool value.

* * * * *